United States Patent
Iguchi et al.

(10) Patent No.: US 7,432,927 B2
(45) Date of Patent: Oct. 7, 2008

(54) EXTENDED PORTFOLIO CHART DRAWING DEVICE, PROCESSING METHOD AND COMPUTER-READABLE MEDIUM RECORDING A PROGRAM OF THE SAME

(75) Inventors: Masayuki Iguchi, Kawasaki (JP); Masao Ezawa, Kawasaki (JP); Tadashi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/288,367

(22) Filed: Nov. 29, 2005

(65) Prior Publication Data

US 2007/0046671 A1   Mar. 1, 2007

(30) Foreign Application Priority Data

Aug. 31, 2005   (JP) .............................. 2005-250416

(51) Int. Cl.
 *G06T 11/20* (2006.01)
(52) U.S. Cl. ..................................... 345/440
(58) Field of Classification Search ................ 345/440, 345/184
See application file for complete search history.

(56) References Cited

U.S. PATENT DOCUMENTS

| | | | | |
|---|---|---|---|---|
| 2,696,610 | A * | 12/1954 | Turley | 342/176 |
| 4,408,848 | A * | 10/1983 | Gast | 353/11 |
| 6,211,887 | B1 * | 4/2001 | Meier et al. | 345/440 |
| 7,271,804 | B2 * | 9/2007 | Evans | 345/440 |
| 7,283,137 | B2 * | 10/2007 | Suyama et al. | 345/440 |
| 2003/0065600 | A1 * | 4/2003 | Terashima et al. | 705/36 |
| 2005/0209780 | A1 * | 9/2005 | Matsuda et al. | 702/2 |
| 2006/0221078 | A1 * | 10/2006 | Ishizuka | 345/440 |
| 2007/0046675 | A1 * | 3/2007 | Iguchi et al. | 345/441 |
| 2007/0198530 | A1 * | 8/2007 | Takahashi et al. | 707/10 |

FOREIGN PATENT DOCUMENTS

JP   2020-197250   7/2002

OTHER PUBLICATIONS www.spreadsheetconverter.com/.../radar-chart-comparing-advertising/radar-chart-comparing-advertising.htm, By: James P. Gilbert, Ph.D., Professor, Crummer Graduate School of Business; Rollings Business Journal Jul.-Sep. 2003 4 pages.*
Pressure measurement of air cushions for patients Tanimoto, Y.; Takechi, H.; Nagahata, H.; Yamamoto, H.; Instrumentation and Measurement Technology Conference, 1999. IMTC/99. Proceedings of the 16th IEEE vol. 2, May 24-26, 1999 pp. 1245-1250 vol. 2 Digital Object Identifier 10.1109/IMTC.1999.777054.*

* cited by examiner

Primary Examiner—Javid A Amini
(74) Attorney, Agent, or Firm—Staas & Halsey LLP

(57) ABSTRACT

An extended portfolio chart drawing device draws an evaluation object on a portfolio chart. The chart drawing device selects the evaluation object to draw a radar chart, extracts a score from an index axis of an evaluation item designated by a dial drag position detection unit for the selected evaluation object from the radar chart data, and draws a triangle representing the direction of the index axis and the score of the evaluation item at a position of the corresponding evaluation object on the portfolio chart. Then, the chart drawing device draws a polygon representing the relationship between all the evaluation values for the selected evaluation object to be expanded from the radar chart data at the position of the corresponding evaluation object on the portfolio chart.

8 Claims, 16 Drawing Sheets

| SERIAL NUMBER OF OBJECT | X COORDINATE | Y COORDINATE | RADIUS | DRAWING COLOR |
|---|---|---|---|---|
| ⋮ | ⋮ | ⋮ | ⋮ | ⋮ |
| i | Xi | Yi | Ri | Cri |
| ⋮ | ⋮ | ⋮ | ⋮ | ⋮ |

| ITEM NUMBER | EVALUATION ITEM NAME | ANGLE |
|---|---|---|
| 1 | ITEM A | 30° |
| 2 | ITEM B | 60° |
| ⋮ | ⋮ | ⋮ |
| j | ITEM j | $\theta j$ |

EXTENDED PORTFOLIO CHART DRAWING DEVICE, PROCESSING METHOD AND COMPUTER-READABLE MEDIUM RECORDING A PROGRAM OF THE SAME

CROSS-REFERENCE TO RELATED APPLICATIONS

This application claims priority from Japanese patent application Serial No. 2005-250416 filed Aug. 31, 2005, the contents of which are incorporated herein by reference.

BACKGROUND OF THE INVENTION

1. Field of the Invention

This invention relates to an extended portfolio chart drawing device and a processing method. More particularly, the present invention relates to a processing device and a processing method for drawing a chart in which radar chart information of an evaluation object is incorporated into a portfolio chart by extending information used to draw the portfolio chart to the radar chart information of the evaluation object on the portfolio chart. The present invention further relates to a computer-readable medium recording a program for enabling a computer to perform the aforementioned processing method.

2. Description of the Related Art

There is a method for displaying a plurality of evaluation objects on a portfolio chart and analyzing the evaluation objects. FIG. 20 shows an example of the portfolio chart. In the portfolio chart of FIG. 20, the evaluation object is displayed using three values of indices, namely two values for a position (X coordinate and Y coordinate) on the plane and one value for a size (radius) of graphic indicating the position. Then, the relationship between evaluation objects is analyzed by their positions and sizes of graphic.

On the other hand, in a radar chart analysis technique as shown in FIG. 21, characteristics of an evaluation object are analyzed, using a radar chart in which the evaluation value of each of evaluation items for the evaluation object, on the basis of a tendency in a shape of a polygonal formed with the point indicating each evaluation value as the apex plotted on the index axis radially provided and the ruggedness of the apex of the polygon.

For instance, in a determination method of using the radar chart disclosed in patent document 1, the quality of determination object is determined by displaying radar charts representing more than one object side by side, calculating the internal area each of the polygonal graphics formed with connection of the apexes drawn on the radar chart, and comparing the internal areas with a area of a reference graphic calculated according to a prescribed procedure.

(Patent document: Japanese Patent Laid-open No. 2002-197250).

The portfolio chart is superior in that it can represent the relationship between evaluation objects. Generally, the values of deciding the position and size of the evaluation object expressed on the portfolio chart are based on the total sum obtained according to a specific calculation formula with the evaluation values of each of a plurality of evaluation items as a parameter.

Accordingly, when only the values indicating the position and size of the evaluation object displayed on the portfolio chart are compared, the cause of superiority or inferiority of the evaluation object may not be clarified. Therefore, it is difficult to grasp the characteristics of the evaluation object. If the analysis relies on the portfolio chart alone, there is a risk that a misidentification or hallucination may be caused in judging the superiority or inferiority of the evaluation object. By combining a portfolio chart and a radar chart indicating evaluation values for each evaluation item of the evaluation object, it is expected to make the analysis and evaluation with higher precision, whereby a drawing method that can present the portfolio chart and the radar chart in association is required. However, there was no system or device for displaying the portfolio chart and the radar chart in association.

Further, with a display method for displaying the portfolio chart and the radar chart separately on the same screen to compare both the charts, the characteristics of the evaluation object can not be assessed rapidly. Also, there is an evil that information is hard to see, if the data of radar chart is simply displayed within the graphic representing the evaluation object on the portfolio chart, for example, the circle employed in the portfolio chart of FIG. 20.

SUMMARY OF THE INVENTION

An object of this invention is to provide an extended portfolio chart drawing device, a processing method and a computer-readable medium recording a program, in which the radar chart information can be evidently displayed on the portfolio chart by associating the portfolio chart information and the radar chart information.

The present invention provides a processing device for drawing a chart incorporating a radar chart information of an evaluation object on a portfolio chart drawing the evaluation object, comprising a portfolio drawing unit for drawing the evaluation object on a predetermined portfolio chart, a radar chart data storage unit for storing radar chart data indicating an evaluation value of a predetermined evaluation item for an evaluation object drawn on the portfolio chart, a drawing object selection unit for selecting the evaluation object to display the radar chart data from the portfolio chart, and a graphic drawing unit for drawing a predetermined graphic generated employing the radar chart data of the selected evaluation object at a position of the evaluation object on the portfolio chart.

In the device according to the invention, the radar chart data storage unit stores the radar chart data indicating the evaluation value of the evaluation item for the evaluation object drawn in the portfolio chart, besides the data for drawing the evaluation object on the portfolio chart. And the portfolio drawing unit draws the evaluation object on the predetermined portfolio chart, and the drawing object selection unit selects the evaluation object to display the radar chart data from the portfolio chart upon an instruction of the user. Then, And the graphic drawing unit draws a predetermined graphic generated using the radar chart data of the selected evaluation object acquired from the radar chart data storage unit, with the predetermined evaluation item set on the index axis, at a position of the evaluation object on the portfolio chart.

In the invention, the information represented by the radar chart can be drawn on one chart of the portfolio chart. Hence, it is possible to present the information indicating a tendency of the evaluation object with the radar chart at the same time while overlooking the relationship between evaluation objects on the portfolio chart.

Also, the graphic drawing unit of the device according to the invention draws, as the graphic, a polygon representing the relationship between all the evaluation values of the selected evaluation object to be expanded over the radar chart.

Particularly, it is possible to draw the polygon representing the tendency of the predetermined evaluation item displayed on the radar chart at the position of the evaluation object on the portfolio chart, and present the tendency of the information on which the position and size on the portfolio chart are based at the same time.

Also, the device according to the invention comprises an evaluation item designation unit for designating the evaluation item of the radar chart data displayed on the portfolio chart, in which the graphic drawing unit draws a triangle representing the direction of the index axis on the radar chart for the designated evaluation item and the height corresponding to the evaluation value of the evaluation item as the graphic.

Particularly, according to the invention, the evaluation value of a specific evaluation item among the evaluation items displayed on the radar chart can be schematically indicated by drawing the triangle with the height corresponding to the magnitude of the evaluation value. As one example, in the portfolio chart representing the evaluation object with the circle, if the evaluation value of the corresponding evaluation item for the evaluation object is small, the circle having a triangular projection such as a short thorn is drawn at the position of the evaluation object, or if the evaluation value of the evaluation item is large, the circle having a long and large projection is drawn.

Moreover, the evaluation item designation unit of the device according to the invention is provided with a dial having an instruction knob rotationally moved along the circumference of a predetermined circle, and if the instruction knob of the dial is rotationally moved by an operation of the user, the index axis coincident with a direction decided by the center of the circumference of the circle and the position of the instruction knob is specified from the radar chart, in which the evaluation item corresponding to the specified index axis is made the designated evaluation item.

Thereby, it is possible to provide an interface that allows the user to intuitively select any evaluation item from among the evaluation items set on the radar chart.

According to the invention, it is possible to draw one chart in which the radar chart information is incorporated on the portfolio chart and the portfolio chart information and the radar chart information are associated.

The user can usually make the analysis as the conventional portfolio chart on the display screen of the extended portfolio chart. Further, the user can intuitively grasp the evaluation values of a plurality of evaluation items on which the total sum indicating the position or size of evaluation object on the portfolio chart is based, with the simplified polygon of the radar chart, while overlooking the portfolio chart.

Particularly, the evaluation value of the specific evaluation item designated by the user is indicated by drawing the triangle with the height corresponding to the magnitude of the evaluation value, and the apex corresponding to the direction of the index axis of the radar chart, whereby the user can visually grasp the superiority of the specific evaluation item.

By presenting the evaluation object in this way, the user can very easily understand the evaluation object.

Moreover, the user can intuitively select the predetermined evaluation item easily by specifying the evaluation item corresponding to the index axis set radially on the radar char employing the rotation angle of the dial provided on the screen.

Furthermore, it is unnecessary to take a trouble of comparing the portfolio chart and the radar chart that are displayed separately, whereby the analysis time is shortened. Also, it is possible to avoid misconception or hallucination of the evaluation item likely to occur when both charts are compared.

DETAILED DESCRIPTION OF THE PREFERRED EMBODIMENTS

Figure 1:
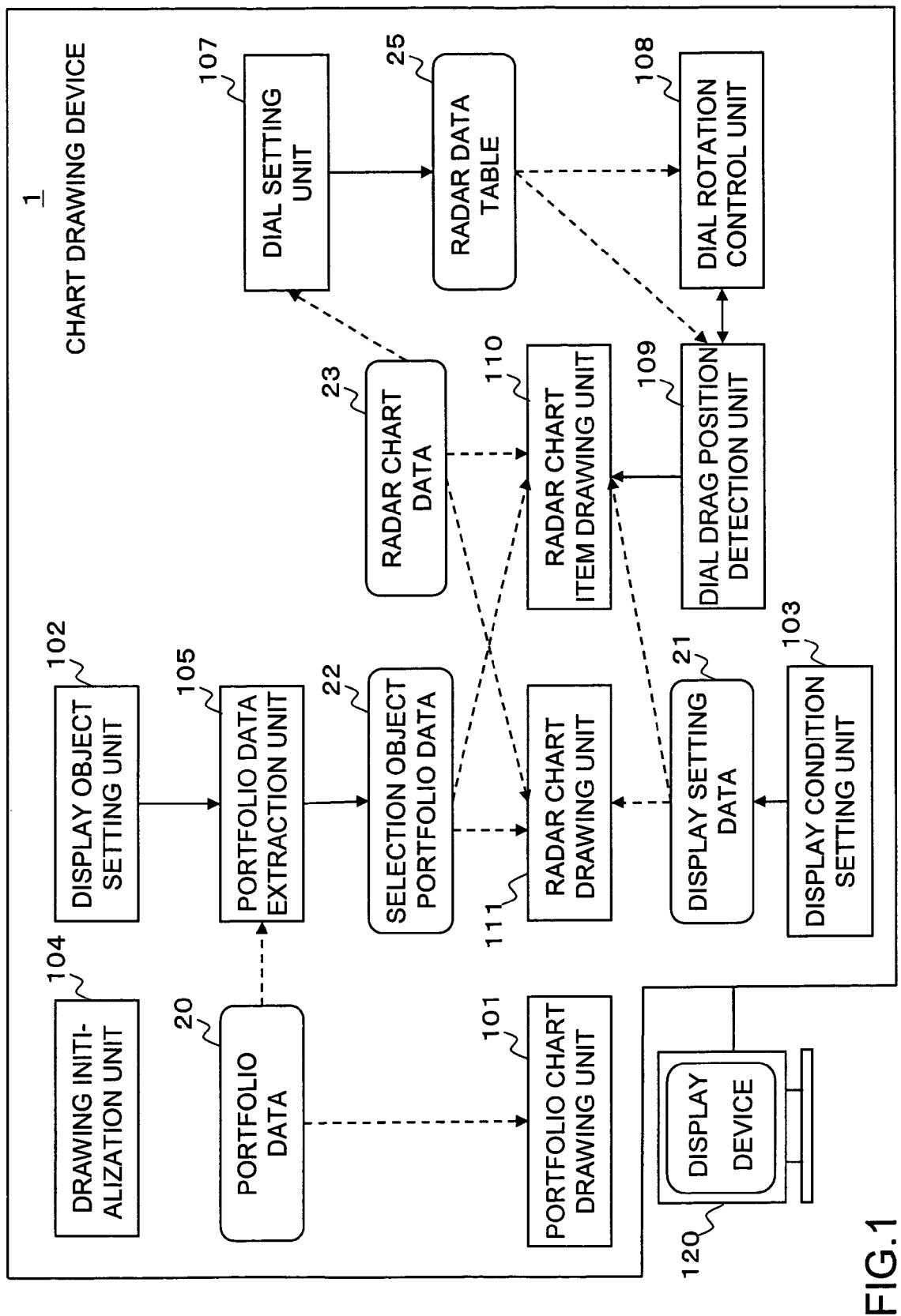
FIG. 1 is a block diagram showing a configuration example of an extended portfolio chart drawing device.

FIG. 1 is a block diagram showing a configuration example of an extended portfolio chart drawing device according to the present invention.

The extended portfolio chart drawing device (hereinafter referred to as a chart drawing device) 1 draws a chart incorporating the information of radar chart for an evaluation item on a portfolio chart where the evaluation item is drawn.

The chart drawing device 1 comprises a portfolio chart drawing unit 101, a display object setting unit 102, a display condition setting unit 103, a drawing initialization unit 104, a portfolio data extraction unit 105, a dial setting unit 107, a dial rotation control unit 108, a dial drag position detection unit 109, a radar chart item drawing unit 110, a radar chart drawing unit 111 and a display device 120.

Figure 2:
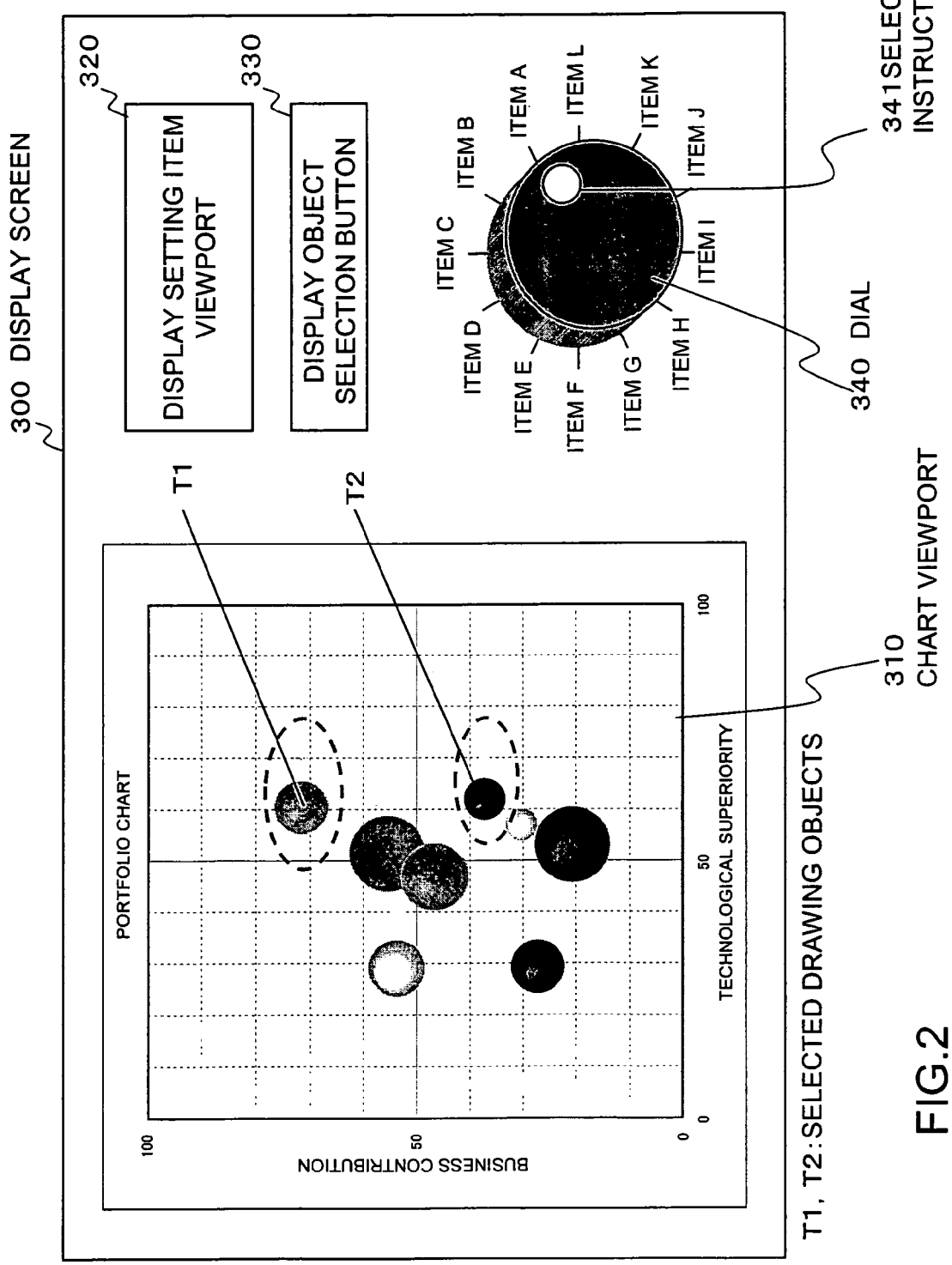
FIG. 2 is a view showing an example of a display screen.

FIG. 2 is a view showing an example of a display screen displayed on the display device 120 through a drawing process by the chart drawing device 1. The display screen 300 comprises a chart viewport 310, a display setting item viewport 320, a display object selection button 330, and a dial 340.

The portfolio chart drawing unit 101 is a processing unit for drawing the portfolio chart of a predetermined evaluation item in the chart viewport 310 on the display screen 300, employing the portfolio data 20. In this form, the portfolio chart represents the evaluation object in terms of the total sum of three evaluation categories. For the evaluation object, the position on a portfolio plane is decided by the X coordinate value and the Y coordinate value corresponding to the total sum of the first and second evaluation categories and the size of a circle representing the evaluation object is decided by the radius of the circle corresponding to the total sum of the third category.

The portfolio data 20 includes the object serial number (i) identifying the evaluation object, X coordinate value Xi and Y coordinate value Yi of portfolio chart, and the size of graphic representing the evaluation object for every evaluation object drawn on the portfolio chart. Herein, the size of graphic of the evaluation object is the radius Ri of the circle.

The display object setting unit 102 is a processing unit for selecting the evaluation object to draw the information of radar chart from among the evaluation objects displayed on the portfolio chart. The display object setting unit 102 sets the evaluation objects T1, T2 selected by mouse click operations of the user from among the evaluation objects on the portfolio chart displayed in the chart viewport 310 of FIG. 2, as the evaluation objects to perform the drawing process for radar chart information.

The display condition setting unit 103 is a processing unit for setting the display conditions for displaying the data based on the radar chart of the evaluation object on the portfolio chart. The display condition setting unit 103 displays the predetermined display setting item in the display setting item viewport 320, extracts the display conditions selected by mouse click operations of the user and holds them in the display setting data 21.

The following display conditions may be set and held, for example:

- Specify whether to display the polygon based on the scores of all the evaluation items on the radar chart (hereinafter referred to as a "radar chart display") or to display the graphic based on the score of a specific evaluation item (hereinafter referred to as a "radar chart item display");
- In displaying the radar chart item, specify whether or not to leave the graphic based on another evaluation item already displayed;
- Specify whether or not to display the evaluation value (score) of designated evaluation item greater than or equal to a predetermined threshold, and to set the numerical value of threshold; and
- Shape of graphic (triangle) representing the radar chart item.

The drawing initialization unit 104 is a processing unit for initializing the portfolio chart by deleting the drawing concerning the radar chart information for the evaluation object on the portfolio chart displayed in the chart viewport 310.

The portfolio data extraction unit 105 is a processing unit for extracting the data of the evaluation item selected by the display object setting unit 102 from the portfolio data 20 and holding it as the selected object portfolio data 22.

Figures 3, 4:
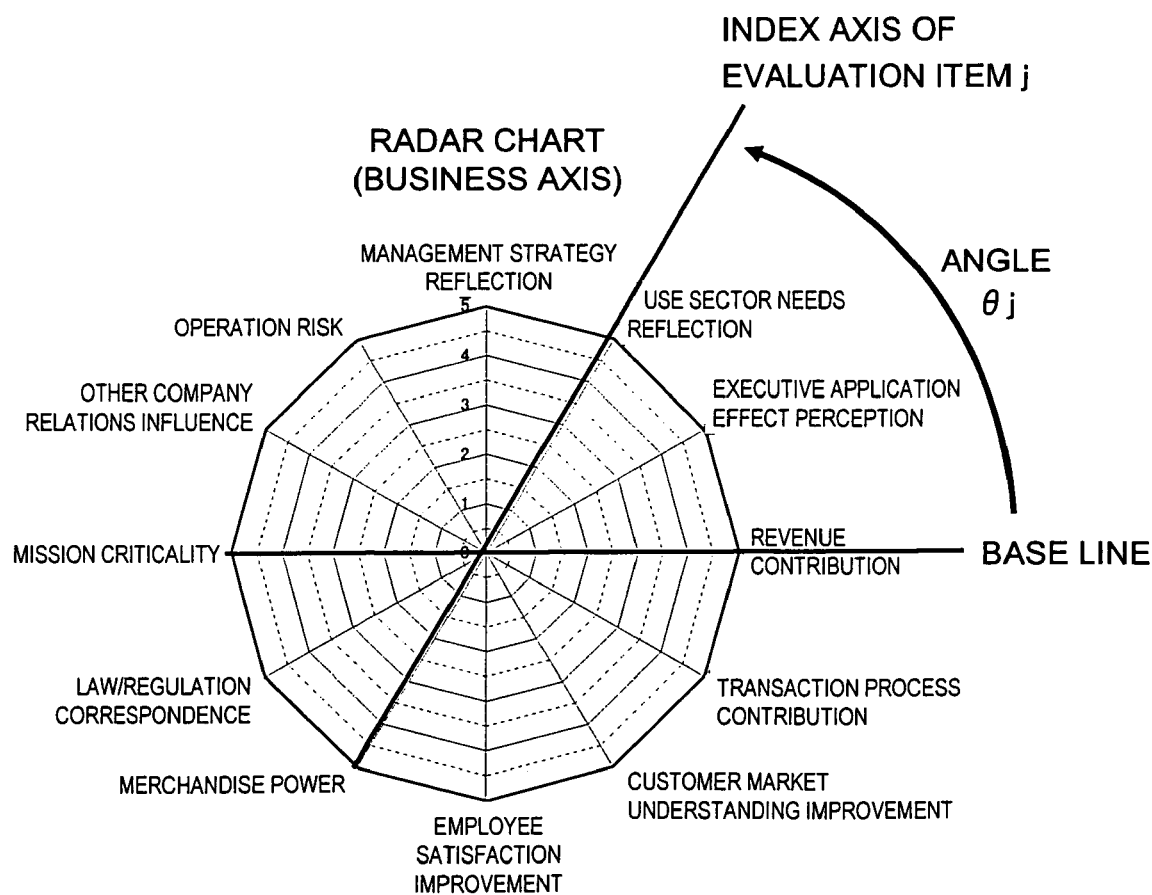
FIG. 3 is a table showing the examples of selected object portfolio data.
FIG. 4 is a view for explaining how to calculate the angle of the index axis for an evaluation item.

FIG. 3 is a table showing an example of selected object portfolio data 22.

The selected object portfolio data 22 includes the object serial number i of the evaluation object selected as the drawing object, X coordinate value Xi and Y coordinate value Yi, the radius Ri of circle indicating the evaluation item, and the drawing color Cpi of graphic representing the evaluation item.

The dial setting unit 107 is a processing unit for setting the dial 340 as an interface for designating the evaluation item to be displayed on the portfolio chart in the radar chart item display and drawing the dial 340 on the display screen 300. The dial setting unit 107 extracts the evaluation item number j, evaluation item name, the number N of index axes for the evaluation item from the radar chart data 23, and calculates the angle θj of each index axis.

Figures 5, 6:
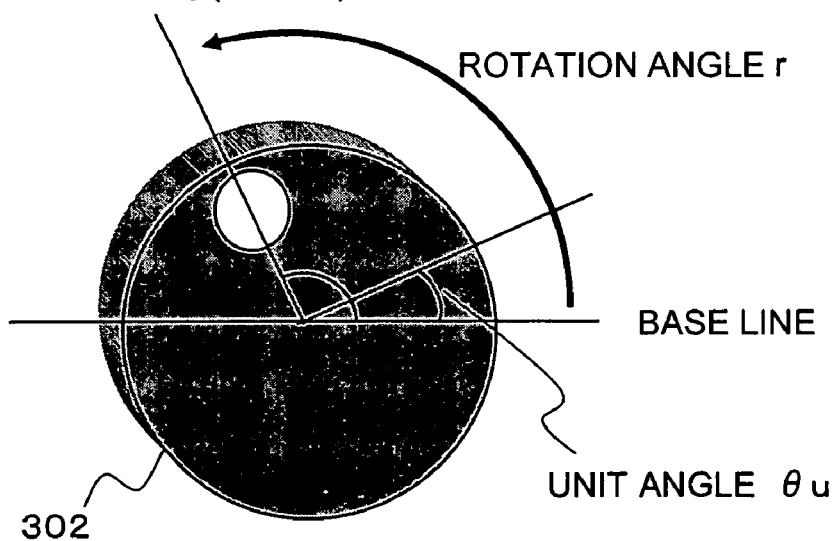
FIG. 5 is a view showing an example of a radar data table.
FIG. 6 is a view for explaining a unit angle of dial rotation and a rotation angle.

The angle θj of index axis is the angle made between the base line parallel to the X coordinate axis of the portfolio chart and the index axis of the evaluation item (item number j), as shown in FIG. 4. And the evaluation item number j (j is an integer from 1 to N), evaluation item name, and the angle θ of index axis (angle made between the base line and the index axis) are stored in a radar data table 25, as shown in FIG. 5.

The radar chart data 23 is the data for displaying, on the radar chart, the score of predetermined evaluation item that is the original information for the total score of each evaluation category of the evaluation object displayed on the portfolio chart. The radar chart data 23 includes the evaluation item number N, item number j of evaluation item, evaluation item name, setting of index axis of evaluation item, score Pij of evaluation item for every evaluation object i displayed on the portfolio chart, and drawing color Cri of radar chart. Herein, the score Pij is the value along the index axis of the evaluation item with item number j (hereinafter evaluation item j) on the radar chart.

The dial setting unit 107 draws the evaluation item name associated with the index axis at a position corresponding to the direction of the index axis on the radar chart around the circumference of the dial 340 drawn on the display screen 300.

The dial rotation control unit 108 is a processing unit for calculating the unit angle θu by which a selection instruction unit 341 of the dial 340 is rotated and moved from the evaluation item number N in the radar chart table 25, drawing the position of the selection instruction unit 341 of the dial 340 while moving it at every unit angle θu by accepting the mouse drag operation of the user, and presenting the selected evaluation item to the user.

The dial drag position detection unit 109 is a processing unit for acquiring the rotation angle r made between the index axis specified at the position and the base line from the position of the selection instruction unit 341 rotated and moved by the mouse drag operation of the user, detecting the angle θj of the index axis matched with the rotation angle r from the radar chart table 25, and specifying the evaluation item name of evaluation item j from the matched angle θj, as shown in FIG. 6.

The radar chart item drawing unit 110 is a processing unit for drawing a triangle representing the direction of the index axis of the evaluation item j on the radar chart and the height corresponding to the score Pij of the evaluation object Ti selected on the portfolio chart for the evaluation item j detected and specified in the dial drag position detection unit 109, based on the radar chart data 23.

Specifically, the radar chart item drawing unit 110 extracts the score Pij of the selected evaluation item Ti from the index axis of the evaluation item j detected at the rotation angle r of the selection instruction unit 341 for the dial 340 in the selected object radar chart data 24. And the coordinates (Xi, Yi) of the evaluation object Ti for the portfolio chart in the chart viewport 310 are acquired from the selected object portfolio data 22, and the triangle indicating the magnitude of score of the evaluation item on the radar chart is drawn with the same color as the drawing color of the evaluation object, based on the acquired coordinates. The triangle is an isosceles triangle, for example, and drawn so that the base and the bisector of apex angle may intersect at coordinates (Xi, Yi), and the apex angle may be located on the line segment making the rotation angle r from the parallel line of the X coordinate axis passing through the coordinates (Xi, Yi).

Figure 7:
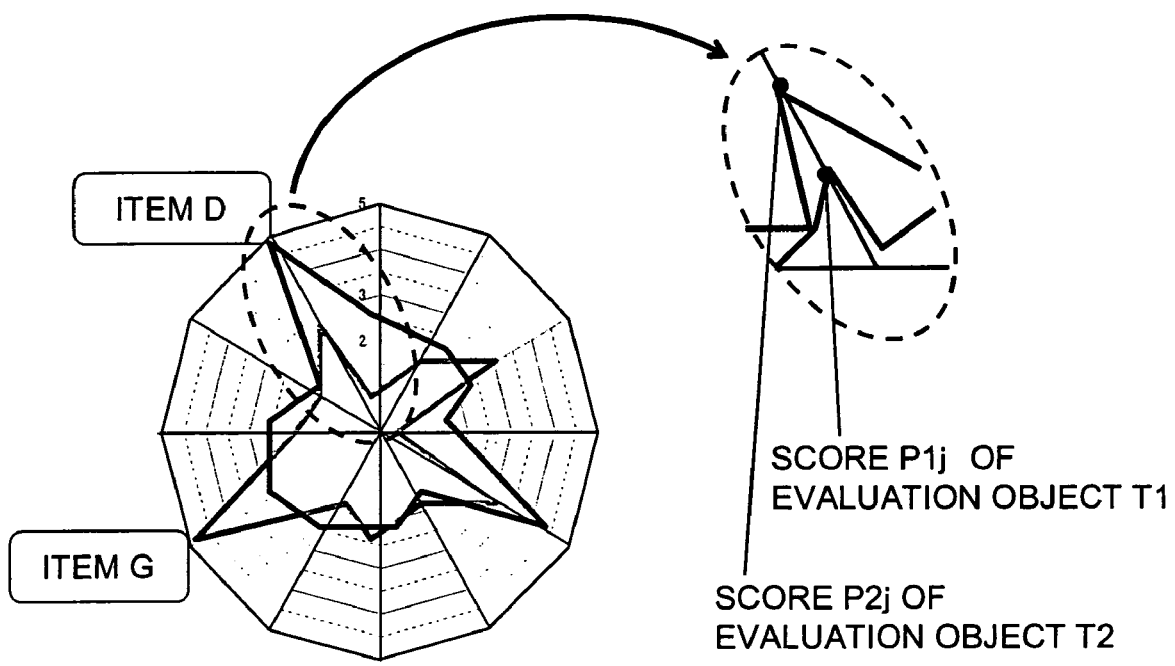
FIG. 7 is a view for explaining a process for extracting the score of evaluation item for the evaluation object from the radar chart.
Figure 8:
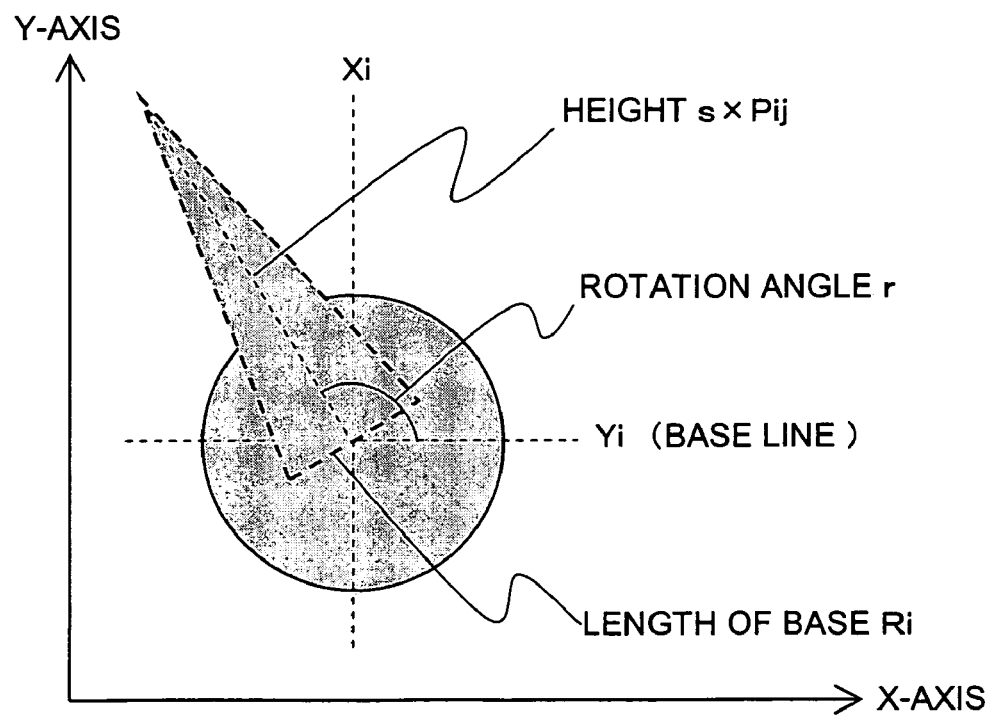
FIG. 8 is a view for explaining how to draw a graphic representing the score of evaluation item that is displayed as a radar chart item.

For the evaluation objects T1, T2 represented by the radar chart as shown in FIG. 7, for example, it is assumed that the item D is selected as the designated item. The radar chart item drawing unit 110 extracts the score P1j(j=4) of the selected evaluation object T1 and the score P2j(j=4) of the evaluation object T2 for the evaluation item j. And a triangle having the base equal to the radius Ri of circle of the evaluation object and the height s×P1j(Pij)(s is a constant) is generated based on the rotation angle r of the evaluation item j and the extracted score P1j at the coordinates (X1, Y1) of the evaluation object T1 for the portfolio chart, and drawn so that the middle point of the base at the triangle may lie at the coordinates (X1,Y1) and the apex may be located on the line making the rotation angle r from the datum point, as shown in FIG. 8.

The radar chart item drawing unit 110 draws the triangle for the designated evaluation item on the evaluation object through the same process, every time the dial 340 is operated to move the position of the selection instruction unit 341, and the designation of another evaluation item is detected from the position of the selection instruction unit 341 moved by the dial drag position detection unit 109.

Figure 9A:
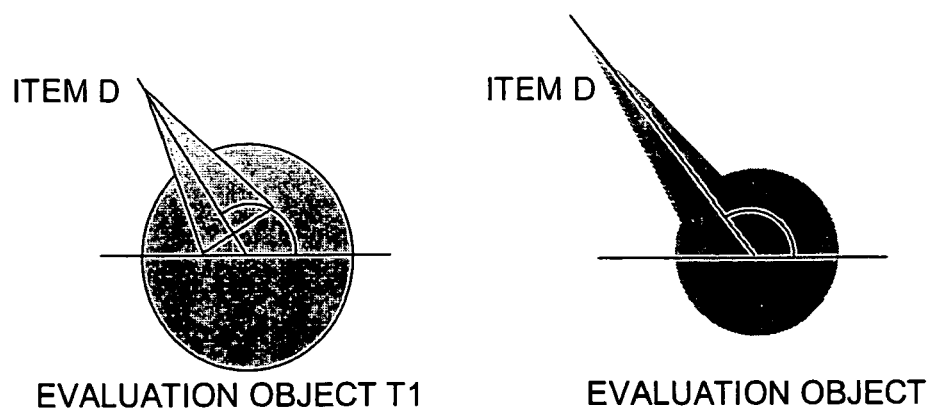
FIG. 9A through 9C are views showing examples of triangle indicating the score of evaluation item.
Figure 9B:
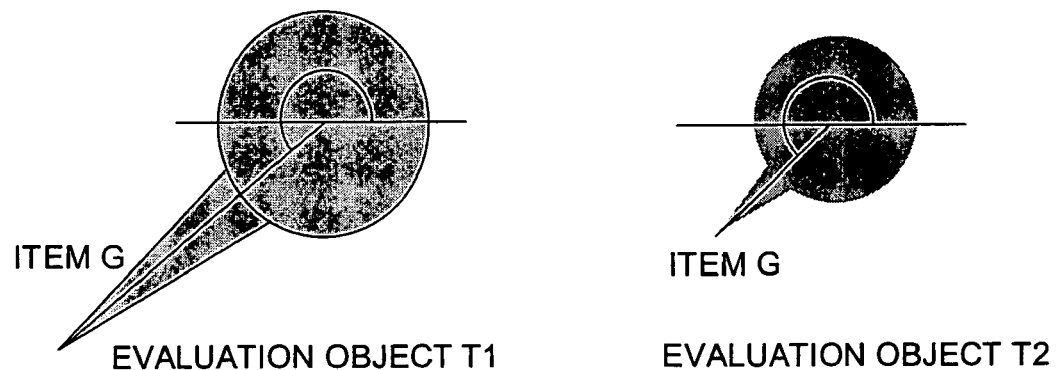
Figure 9C:
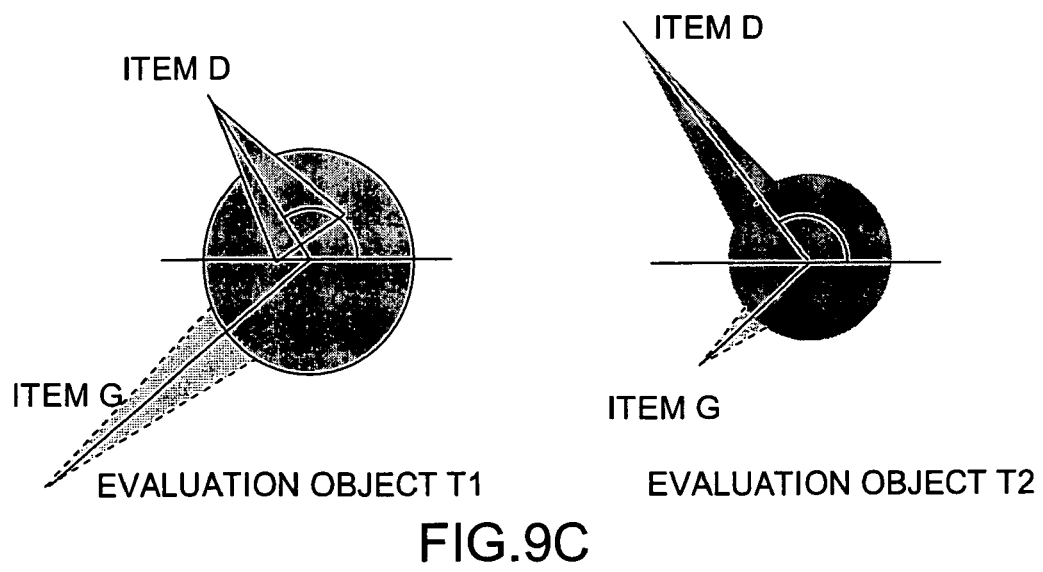

FIG. 9A through 9C show the drawing examples in which the triangles indicating the score of evaluation item designated for the evaluation objects T1, T2 are drawn on the radar chart item display.

In FIG. 9A, when the item D of the radar chart is designated as shown in FIG. 7, the triangle having the height according to the magnitude of score for the item D is drawn as the projection (thorn) indicating the same direction as the index axis of the item D. Also, in FIG. 9B, when the item G of the radar chart is designated as shown in FIG. 7, the triangle having the height according to the magnitude of score for the item G is drawn as the projection (thorn) indicating the same direction as the index axis of the item G. Also, in FIG. 9C, when the item D of the radar chart is designated and then the item G is designated as shown in FIG. 7, the triangle representing the direction of each index axis and having the height according to the magnitude of score for each of the items D and G is drawn, if the display condition for leaving the radar chart item already drawn untouched is set in the display setting data 21.

It is possible to grasp at a glance that the score P2j of the evaluation object T2 is greater than the score P1j of the evaluation object T1 for the item D, and the score P1j of the evaluation object T1 is greater than the score P2j of the evaluation object T2 for the item G, as shown in FIG. 9A through 9C.

Figure 10A:
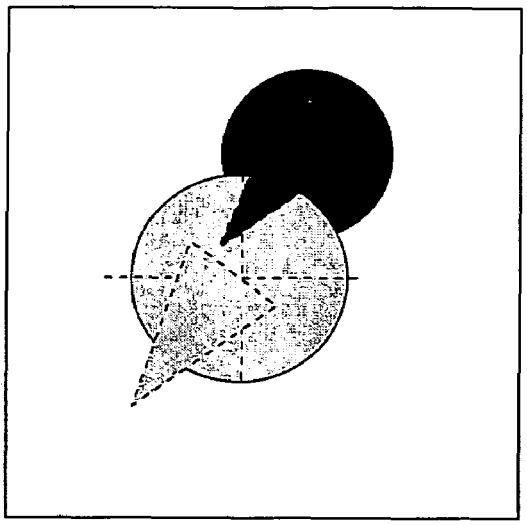
FIG. 10A through 10C are views showing examples of triangle showing the score of evaluation item when the evaluation objects are adjacent.
Figure 10B:
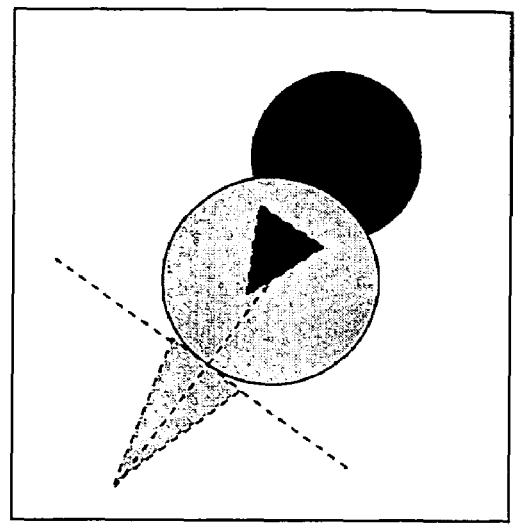
Figure 10C:
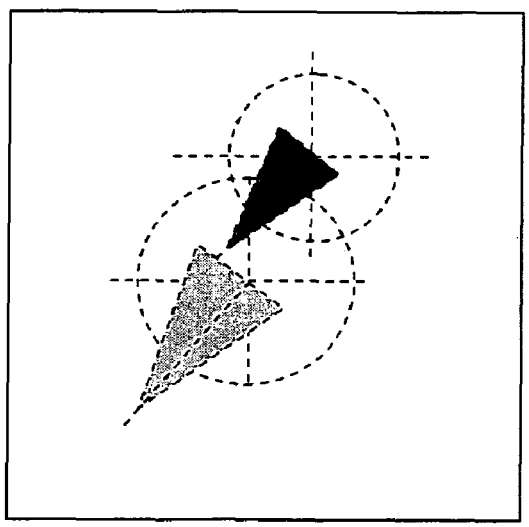

The radar chart item drawing unit 110 draws the radar chart item on the front face before graphics representing other evaluation objects at any time, if a plurality of selected evaluation objects are adjacent, and the triangle of thorn to be drawn overlap the graphic (circle) indicating another evaluation object, as shown in each FIG. 10A through 10C. Also, the radar chart item drawing unit 110 draws, as the initialization, the generated triangle so that the base may overlap the coordinates of the evaluation object, as shown in FIG. 10A. Also, the triangle representing the score of evaluation item is drawn so that the base may be the tangential line of the circle indicating the evaluation item in accordance with the designated display setting item, for example, as shown in FIG. 10B. Also, the triangle representing the radar chart item may be only drawn at the coordinates of the evaluation object without drawing the circle indicating the evaluation object, as shown in FIG. 10C.

Also, the radar chart item drawing unit 110 may draw only the radar chart items in which the score of the evaluation item is greater than or equal to the threshold, if a predetermined threshold is set as the display condition.

Figure 11:
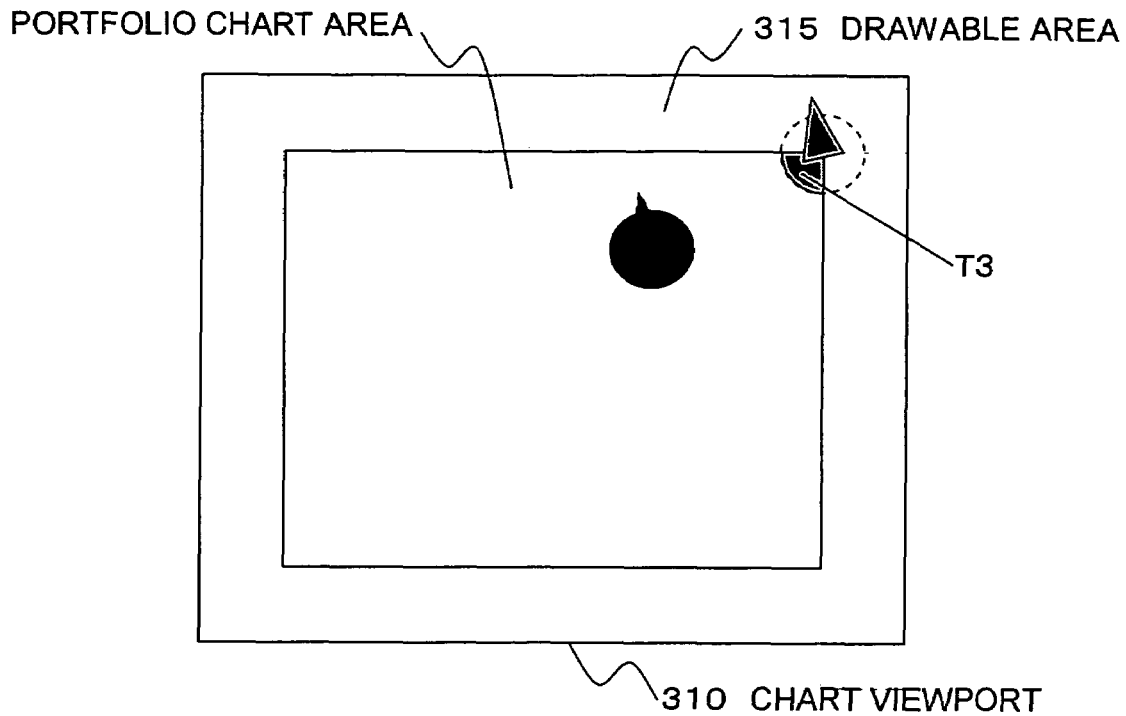
FIG. 11 is a view showing an example of a drawable area provided on the margin around a portfolio chart area in a chart viewport.

Also, if the evaluation object T3 located on the periphery of the portfolio chart is selected, the radar chart item drawing unit 110 presets a drawable area 315 where the radar chart or radar chart item can be drawn on the margin of the portfolio chart area within the chart viewport 310 to permit the radar chart item to be drawn outside the coordinate area of the portfolio chart, as shown in FIG. 11.

Figure 12:
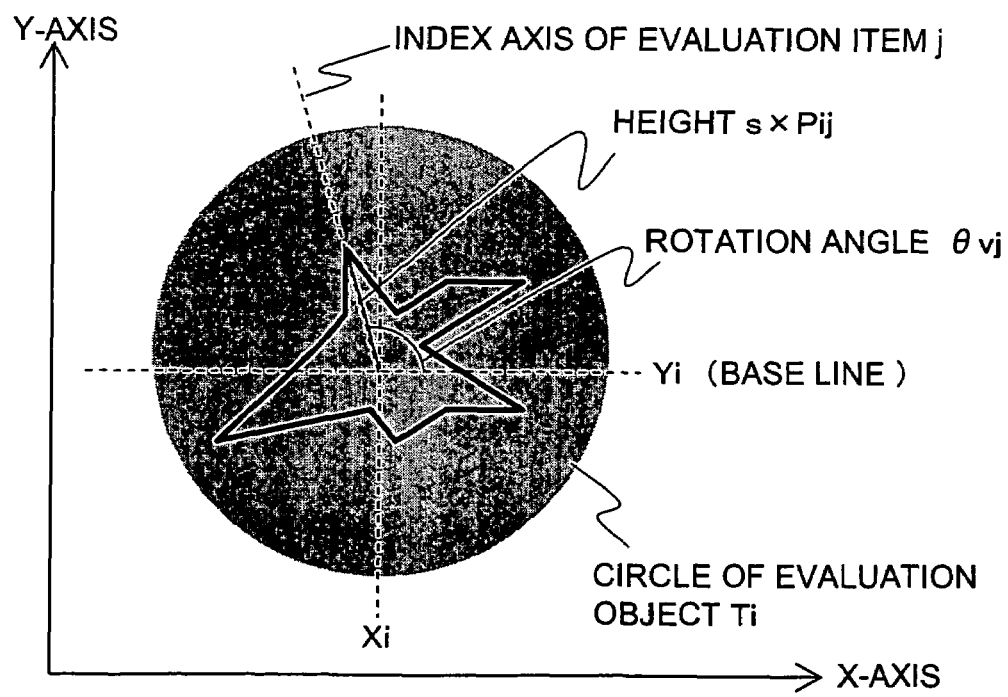
FIG. 12 is a view for explaining how to generate and draw the polygon of radar chart for the evaluation object.

The radar chart drawing unit 111 is a processing unit for drawing a polygon generated by expanding the scores Pi of all the evaluation items for the selected evaluation object Ti on the radar chart within the graphic representing the evaluation object. Specifically, the angle θv=2π/N between index axes for the N evaluation items j is calculated based on the radar chart data 23. And for the evaluation object Ti, the angle θvj from the base line parallel to the X coordinate axis of the portfolio chart to the index axis of the evaluation item j is obtained in the order from the first evaluation item j, and the score Pij is extracted from the index axis of the evaluation item j. And the angle θvj and score Pij are acquired for all the evaluation items, the coordinates (Xi, Yi) on the portfolio chart of the evaluation object Ti are extracted, and the position of score Pij is calculated around the coordinates (Xi, Yi), as shown in FIG. 12. The position of score Pij is:

$X \text{ coordinate}=Xi+s \times Pij \times \cos(\theta vj)$ $Y \text{ coordinate}=Yi+s \times Pij \times \sin(\theta vj)$ And a polygon with all the scores Pi as the apex is generated, and drawn with the radar chart drawing color Cri within the graphic representing the evaluation object Ti.

Figure 13:
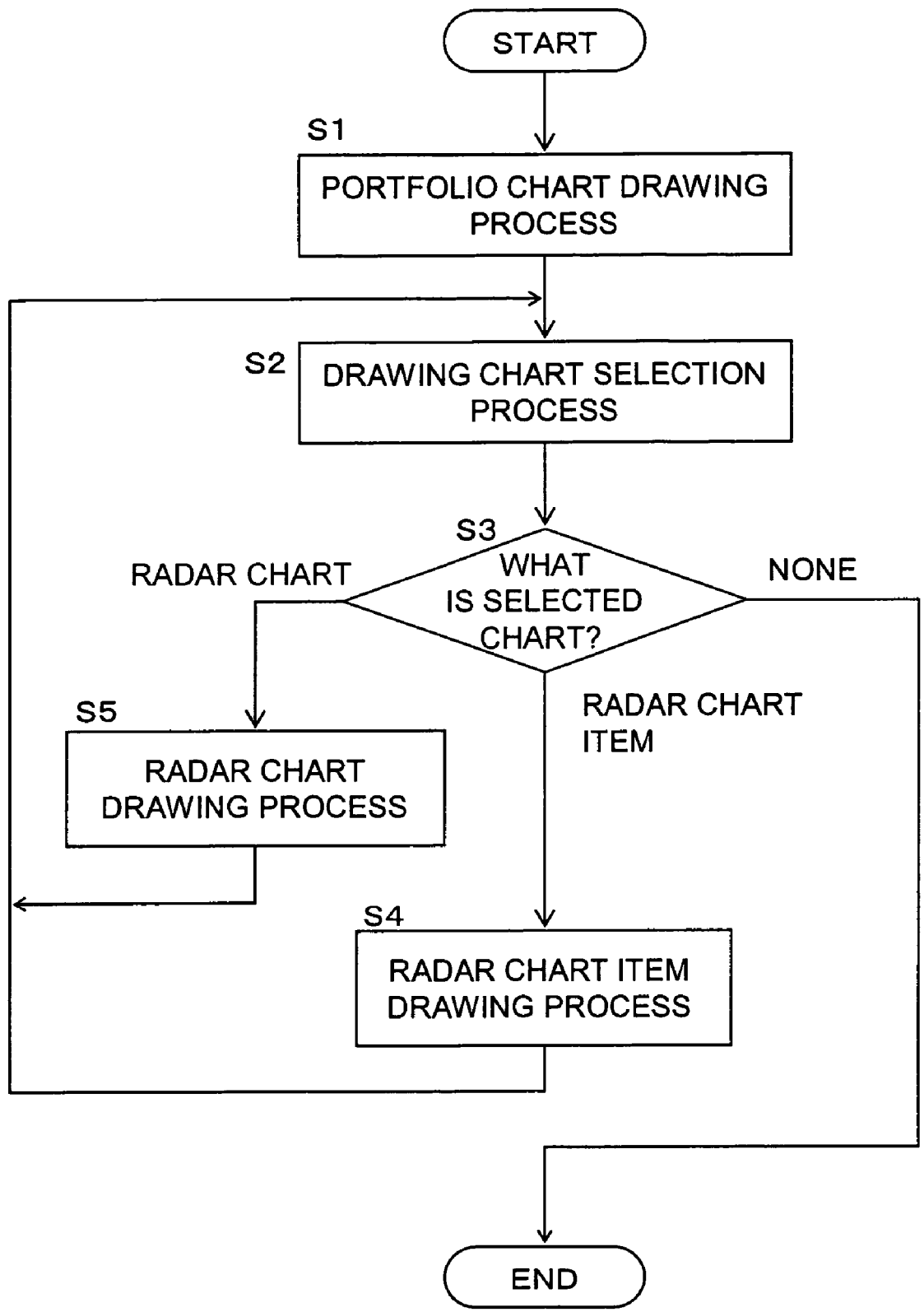
FIG. 13 is a flowchart showing the schematic processing flow of the extended portfolio chart drawing device.

The processing flow of the invention is shown in FIGS. 13 to 19. FIG. 13 is a flowchart showing a schematic processing flow of the chart drawing device 1 of the invention.

The chart drawing device 1 performs a portfolio chart drawing process (step S1). The portfolio chart drawing unit 101 draws a predetermined portfolio chart and the evaluation object Ti in the chart viewport 310 on the display screen 300, employing the portfolio data 20.

Thereafter, a process for selecting the chart to be drawn for the evaluation object Ti displayed on the portfolio chart in the chart viewport 310 is performed (step S2). The display condition setting unit 103 detects which display item is selected by the user, "radar chart display" or "radar chart item display" displayed in the display setting item viewport 320 on the display screen 300.

If the detected item is "radar chart item display" (step S3), a drawing request is sent to the radar chart item drawing unit 110 to perform the radar chart item drawing process (step S4). Also, if the detected item is "radar chart display" (step S3), a drawing request is sent to the radar chart drawing unit 111 to perform the radar chart drawing process (step S5).

Figure 14:
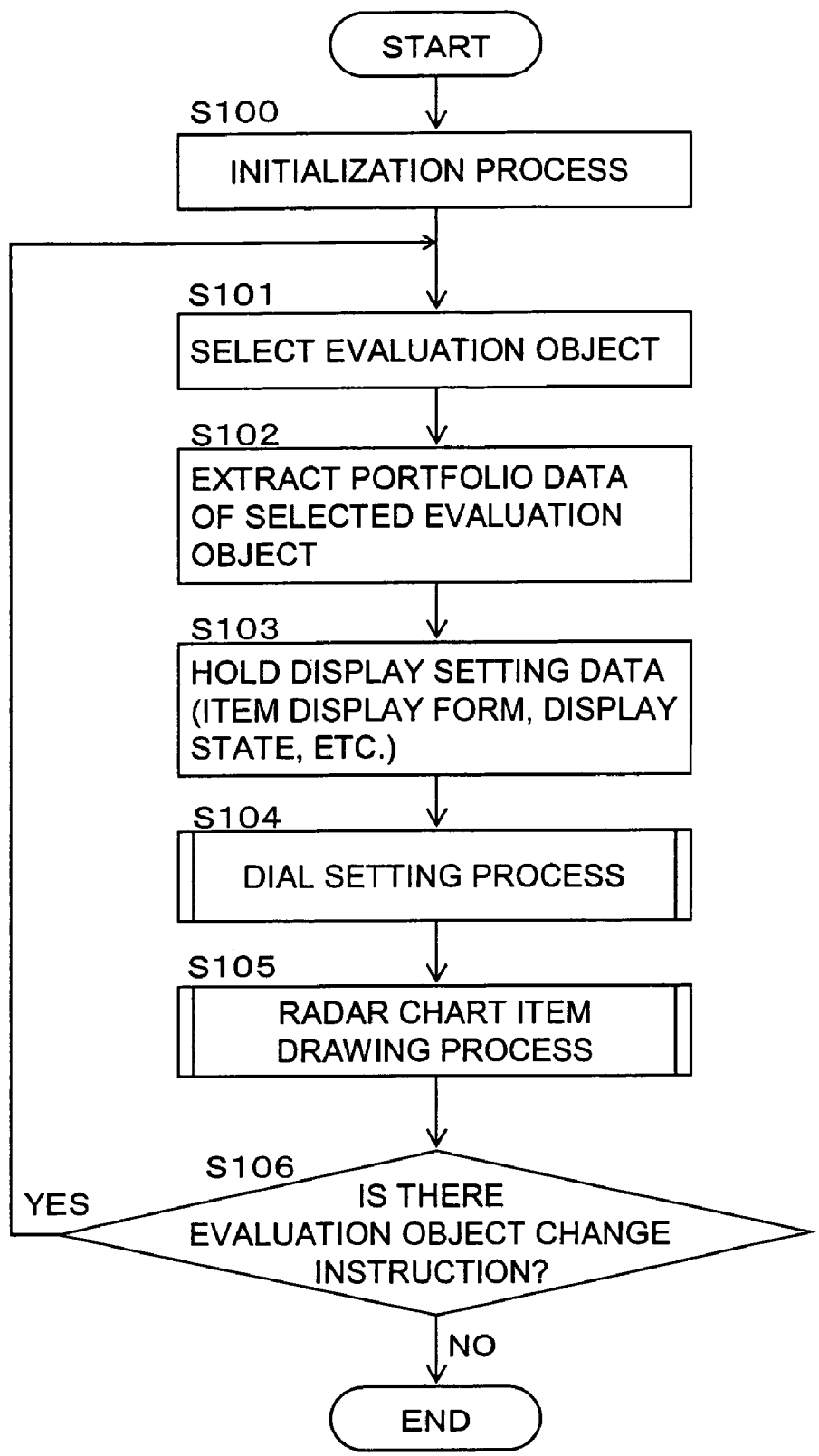
FIG. 14 is a flowchart showing the detailed processing flow of a radar chart item drawing process at step S4.

FIG. 14 is a detailed processing flowchart showing the radar chart item drawing process at step S4.

The drawing initialization unit 104 performs the initialization process (step S100). The drawing initialization unit 104 extracts the serial number i of the evaluation object, coordinates (Xi, Yi), and the radius Ri of circle for the evaluation object selected at the previous processing and stored in the selection object portfolio data 22, and deletes all the thorns (projections) representing the score of evaluation item generated and drawn at the coordinates of each evaluation object Ti selected on the portfolio chart.

And the display object setting unit 102 notifies the selected evaluation object Ti to the portfolio data extraction unit 105 if the evaluation object Ti displayed in the chart viewport 310 on the display screen 300 is selected and the display object selection button 330 is pressed by mouse click operations of the user (step S101).

The portfolio data extraction unit 105 extracts the portfolio data of the selected evaluation object Ti from the portfolio data 20, and holds it as the selected object portfolio data 22 (step S102).

The display condition setting unit 103 inputs the display conditions such as display shape and display state of the radar chart item set in the display setting item viewport 320 on the display screen 300 by the user and holds it as the display setting data 21, when selecting the drawing chart (step S103).

Next, the dial setting unit 107 additionally draws the dial 340 for selecting the evaluation item name that is displayed in the radar chart item on the display screen 300 (step S104). The details of the dial setting process will be described later.

Next, radar chart item drawing unit 110 acquires the evaluation item of radar chart designated by the user via the dial drag position detection unit 109, and performs the drawing process of radar chart item for the designated evaluation object Ti (step S105). The details of the radar chart item drawing process will be described later.

Thereafter, if there is an instruction of changing the evaluation object for drawing the radar chart item by mouse clicking another evaluation object Ti in the chart viewport 310 (YES at step S106), the procedure returns to the processing of step S101. If there is no instruction of changing the evaluation object (No at step S106), the procedure is ended.

Figure 15:
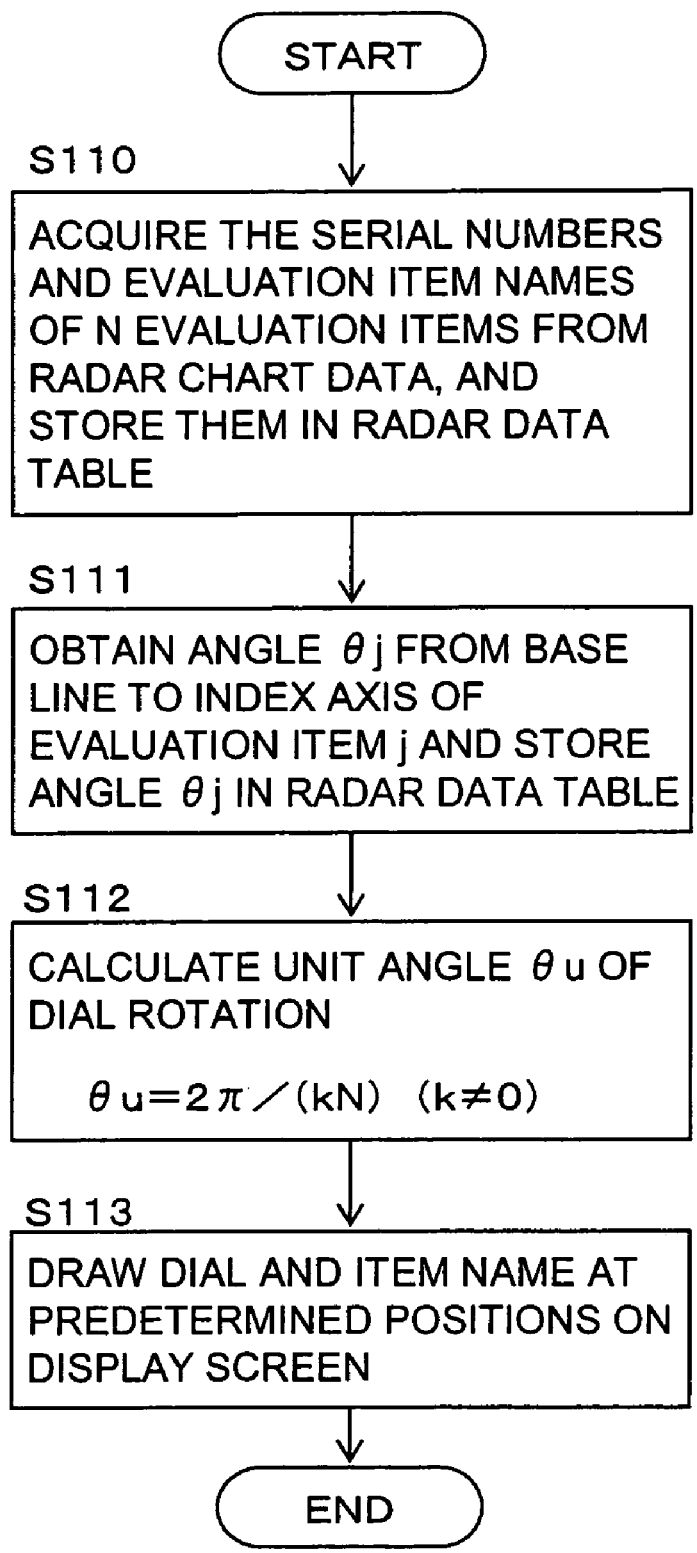
FIG. 15 is a flowchart showing the detailed processing flow of a dial setting process at step S104.

FIG. 15 is a flowchart showing the detailed processing flow of the dial setting process at step S104.

The dial setting unit 107 acquires the serial numbers and evaluation item names of N evaluation items from the radar chart data 23 and stores them in the radar data table 25 (step S110). And the base line parallel to the X coordinate axis of the portfolio chart is set and the angle $\theta j$ from the base line to the index axis of evaluation item j is obtained, and stored in the radar data table 25 (step S111). And the unit angle $\theta u$ of dial rotation is calculated (step S112). The unit angle $\theta u=2\pi/(kN)$ (k is an integer except for zero). For instance, assuming k=1 for the number of evaluation items N=12, namely, the radar chart with twelve index axes, the unit angle $\theta u$=30 degrees.

And the dial 340 having the selection instruction unit 341 and the evaluation item name are drawn at the predetermined positions of the display screen 300 (step S113).

The dial rotation control unit 108 controls the dial rotation by moving the selection instruction unit 341 at every unit angle $\theta u$ set by the dial setting unit 107, if the user rotates the dial 340 by mouse dragging.

Figure 16:
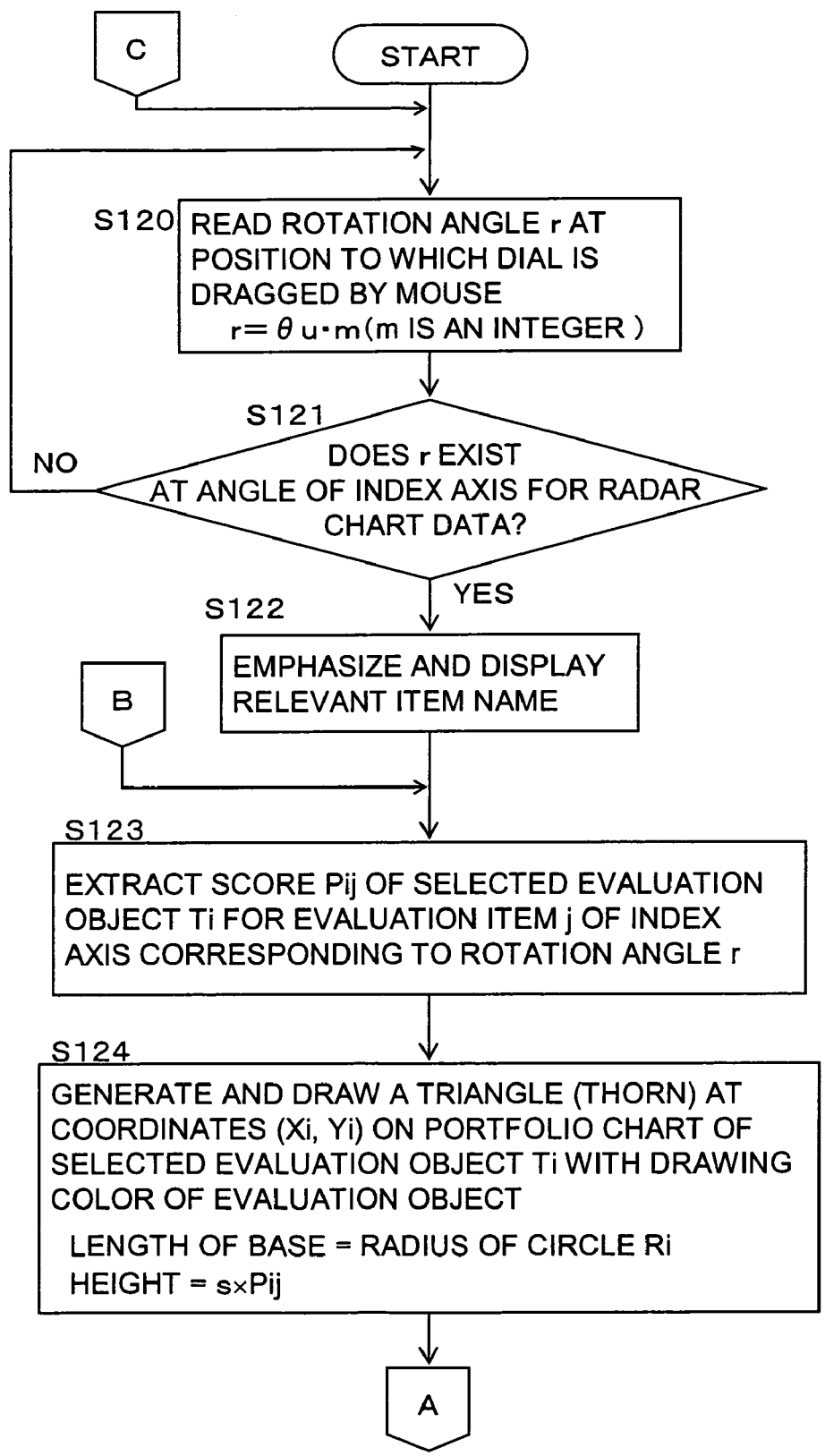
FIG. 16 is a flowchart showing the detailed processing flow of a radar chart item drawing process at step S105.
Figure 17:
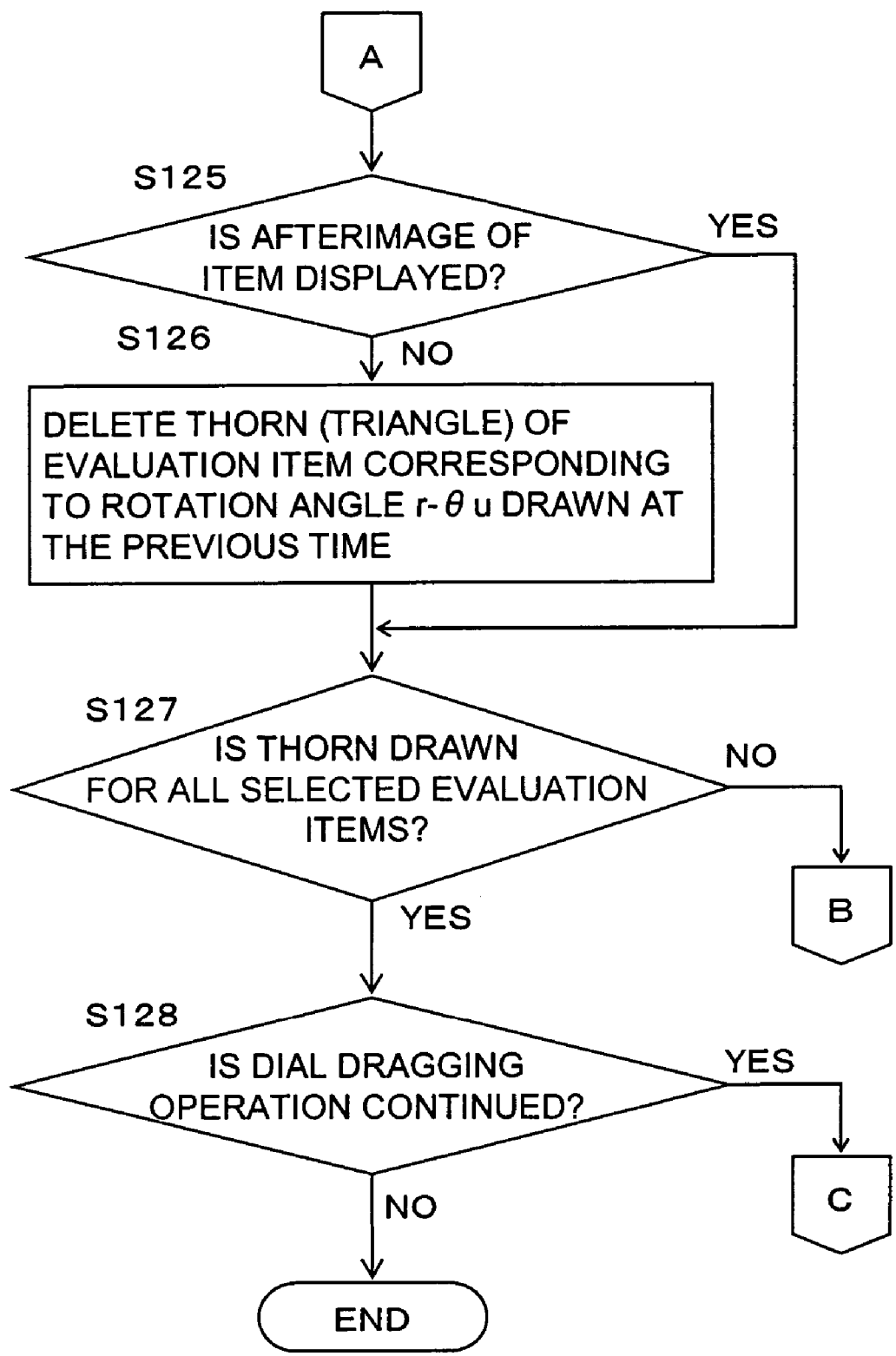
FIG. 17 is a flowchart showing the detailed processing flow of the radar chart item drawing process at step S105.

FIGS. 16 and 17 are flowcharts showing the detailed processing flow of the radar chart item drawing process at step S105.

The dial drag position detection unit 109 reads the rotation angle $r=\theta u \times m$ (m is an integer) at the position of the selection instruction unit 341 rotated and moved, if the dial 340 is mouse dragged by the user (step S120). And it is checked whether or not the rotation angle r exists at the set angle of the index axis for the evaluation item set in the radar chart data 23 (step S121). If any set angle of the index axis is coincident with the rotation angle r (YES at step S121), the corresponding evaluation item name among the evaluation item names drawn around the dial 340 is emphasized and displayed through the drawing process of bold, different color or enlarged font (step S122).

And the score Pij of selected evaluation object Ti for the evaluation item j of the index axis corresponding to the rotation angle r is extracted from the radar chart data 23 (step S123).

Moreover, the coordinates (Xi, Yi) on the portfolio chart for the evaluation object Ti selected from the selected object portfolio data 22 are extracted, and the thorn having the height indicating the size of corresponding evaluation item as the radar chart item with the drawing color Cri of graphic of the evaluation object Ti at the coordinates (Xi, Yi) is generated and drawn (step S124). Herein, the shape of thorn is the isosceles triangle, in which the radius Ri of circle indicating the length of base=evaluation object Ti, and the height=$s \times Pij$ (s is a constant).

And it is checked whether or not the display condition (after image display) such as drawing with the previously drawn thorn left is set in the display set data 21 (step S125). Only if the after image of thorn is not displayed (NO at step S125), the thorn of evaluation item for the index axis corresponding to the rotation angle r drawn at the previous time-unit angle $\theta u$ is deleted (step S126).

And if the thorn is not drawn for any of the selected evaluation objects Ti (NO at step S127), the procedure returns to the processing of step S123. Also, if the thorn is drawn for all the selected evaluation objects Ti (YES at step S127), it is detected whether or not the mouse dragging operation of the dial 340 continues (step S128).

And if the dragging operation of the dial 340 continues (YES at step S128), the procedure returns to the processing of step S120, or if the dragging operation of the dial 340 does not continue (NO at step S128), the procedure is ended.

Figure 18:
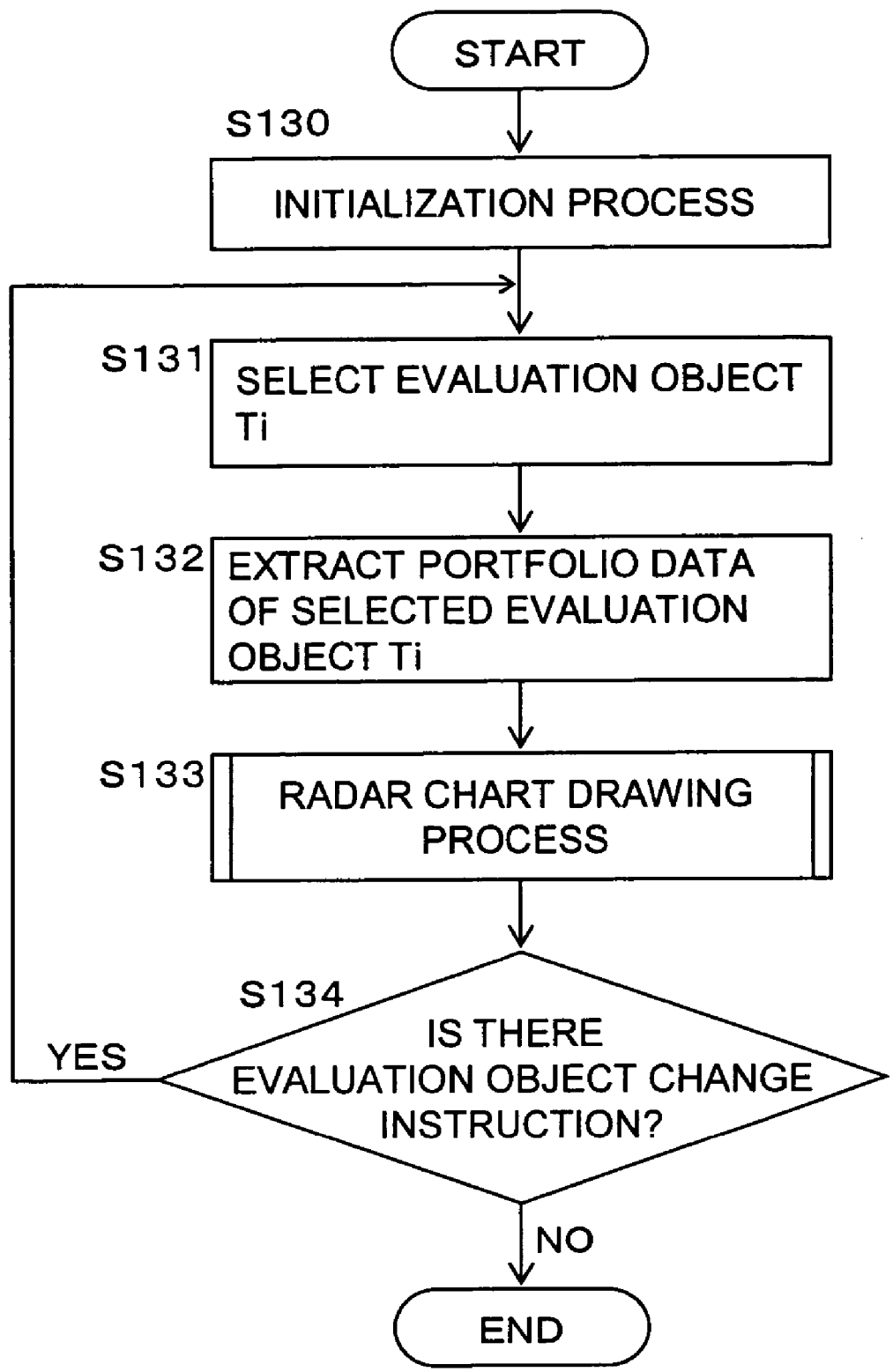
FIG. 18 is a flowchart showing the detailed processing flow of a radar chart drawing process at step S5.

FIG. 18 is a flowchart showing the detailed processing flow of the radar chart drawing process at step S5 of FIG. 13.

The drawing initialization unit 104 performs the initialization process (step S130). The drawing initialization unit 104 extracts the serial number i of the evaluation object, coordinates (Xi, Yi), and the radius Ri of circle indicating the evaluation object selected at the previous processing and stored in the selected object portfolio data 22, and deletes all the polygons representing the radar charts within the graphic of evaluation object, generated and drawn in the coordinates of each evaluation object Ti selected on the portfolio chart.

And the display object setting unit 102 notifies the selected evaluation object Ti to the portfolio data extraction unit 105 if the evaluation object Ti displayed in the chart viewport 310 on the display screen 300 is selected and the display object selection button 330 is pressed by mouse click operations (step S131). And the portfolio data extraction unit 105 extracts the portfolio data of the selected evaluation object Ti from the portfolio data 20, and holds it as the selected object portfolio data 22 (step S132).

The radar chart drawing unit 111 performs the drawing process of radar chart for the designated evaluation object Ti (step S133). The details of the radar chart drawing process will be described later.

Thereafter, if there is an instruction of changing the evaluation object for drawing the radar chart by mouse clicking another evaluation object in the chart viewport 310 (YES at step S134), the procedure returns to the processing of step S131. If there is no instruction of changing the evaluation object (No at step S134), the procedure is ended.

Figure 19:
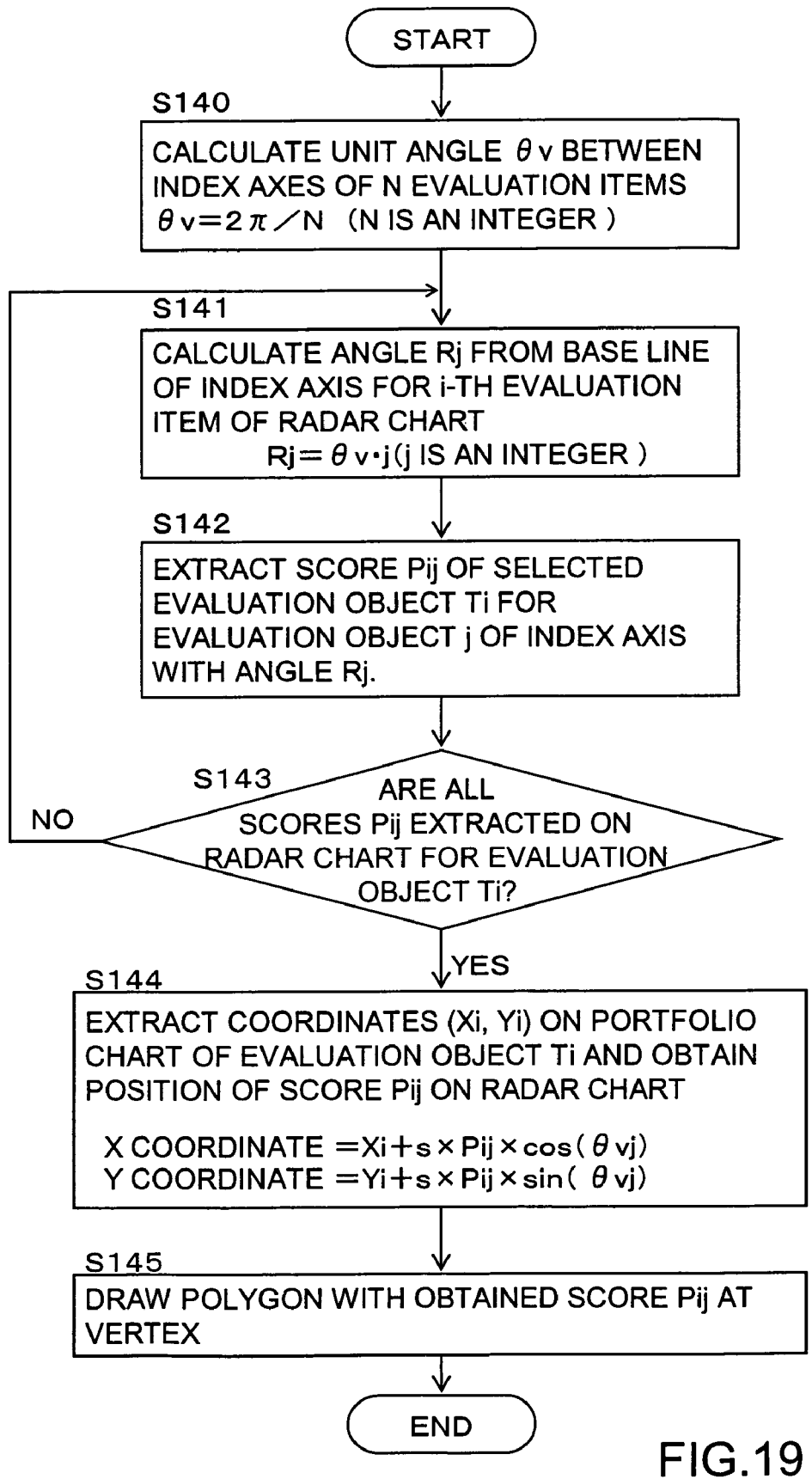
FIG. 19 is a flowchart showing the detailed processing flow of a radar chart drawing process at step S133.
Figure 20:
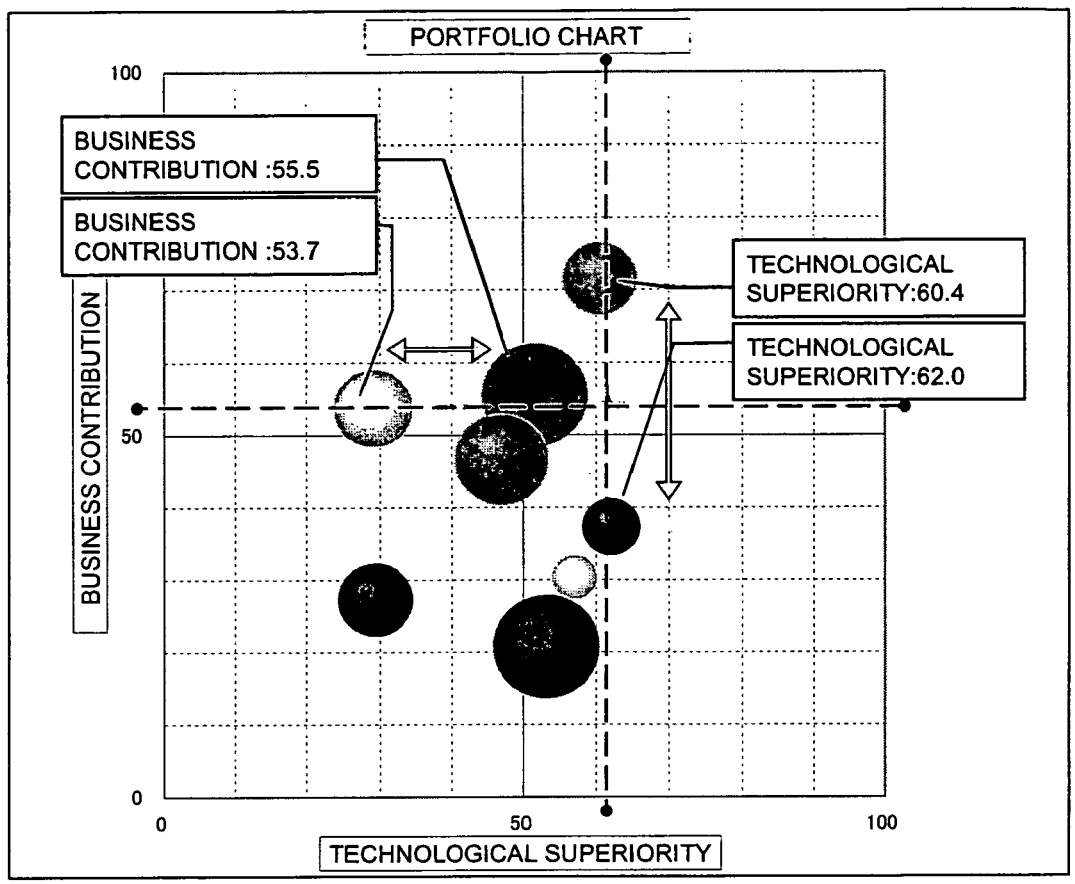
FIG. 20 is a view showing an example of portfolio chart.
Figure 21:
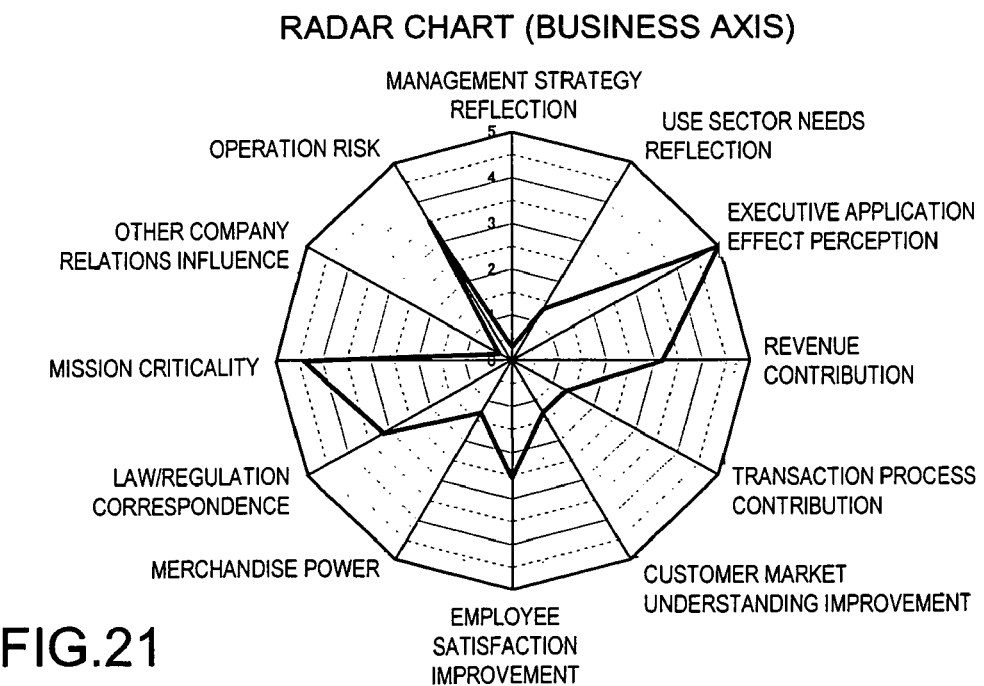
FIG. 21 is a view showing an example of radar chart.

FIG. 19 is a flowchart showing the detailed processing flow of the radar chart drawing process at step S133.

The radar chart drawing unit 111 calculates the unit angle θv between index axes for the N evaluation items from the radar chart data 23 (step S140). It is supposed that the unit angle θv=2π/N (N is an integer). Moreover, the angle Rj from the base line is calculated for the index axis of the ith evaluation item of radar chart (step S141). It is supposed that the angle Rj=θv·j (j is an integer). Moreover, the score Pij of the selected evaluation object Ti from the evaluation item j of the index axis corresponding to the angle Rj is extracted from the radar chart data 23 (step S142).

If all the scores Pij of the evaluation object Ti for the evaluation item j on the radar chart are not extracted (NO at step S143), the procedure returns to the processing of step S141.

And if all the scores Pij of the evaluation object Ti for the evaluation item j on the radar chart are extracted (YES at step S143), the coordinates (Xi, Yi) on the portfolio chart of the evaluation object Ti selected from the selection object portfolio data 22 are extracted, and the position (XY coordinates) of the score Pij is obtained as, $X$ coordinate$=Xi+s\times Pij\times \cos(\theta vj)$ $Y$ coordinate$=Yi+s\times Pij\times \sin(\theta vj)$ based on the coordinates (Xi, Yi) of the evaluation object Ti (step S144).

And a polygon with the obtained score Pij as the apex is drawn with the drawing color Cri of the radar chart (step S145).

Though the invention has been described above in terms of the embodiments, of course, various changes may be made thereto without departing from the spirit or scope of the invention.

Also, the invention is described as the processing program read and executed by the computer, the processing program for implementing the invention may be stored in an appropriate computer readable recording medium such as a portable medium memory, a semiconductor memory, or a hard disk, and provided in the form of the recording medium recording the program, or transmitted or received via a communication interface across various communication networks.

What is claimed is:

1. An extended portfolio chart drawing device drawing a chart incorporating radar chart information of an evaluation object on a portfolio chart, comprising:
    a portfolio drawing unit drawing the evaluation object on the portfolio chart;
    a radar chart data storage unit storing radar chart data indicating each evaluation value of predetermined evaluation items for the evaluation object drawn on the portfolio chart;
    a drawing object selection unit selecting the evaluation object from the evaluation objects drawn on the portfolio chart to display the radar chart data; and
    a graphic drawing unit overlaying a predetermined graphic generated based on the radar chart data of the selected evaluation object on the graphic of the selected evaluation object drawn in the area formed with the coordinates of the portfolio chart,
    wherein the graphic drawing unit draws, as the graphic, a polygon representing the relationship between all the evaluation values of the selected evaluation object to be drawn on the radar chart,
    an evaluation item designation unit designating one of the evaluation items to be displayed on the portfolio chart,
    wherein the graphic drawing unit obtains the evaluation items set for the radar chart, set each index axis of the evaluation items to a line, a direction of which is predetermined as the index axis specified by a rotation angle from the predetermined base line, sets the starting position on the index axes, which is the vertex of the rotation angle, at the position of the evaluation object in the coordinates of the portfolio chart, determines points representing the evaluation values on the index axes individually, and
    draws a polygonal graphic containing all the determined points as apexes representing the designated evaluation item by a direction of a bisector of the apex angle and the value of the evaluation item by a length of the bisector from the starting point to the apex.

2. The extended portfolio chart drawing device according to claim 1, wherein the graphic drawing unit obtains the designated evaluation items specifies the index axis of the designated evaluation item by the rotation angle from the predetermined base line, determines the position corresponding to the evaluation values on the index axis, and draws as the graphic a triangle containing the vertex representing the evaluation value by having the height up to the score position from the starting point.

3. The extended portfolio chart drawing device according to claim 1, wherein the evaluation item designation unit is provided with a dial having an instruction knob rotationally moved along the circumference of a predetermined circle, and when the instruction knob of the dial is rotationally moved by an operation of a user, the index axis is identified coincidently with a direction which is specified by the two positions of the center of the circle and the position on the circumference of the instruction knob, and the evaluation item corresponding to the specified index axis is designated.

4. The extended portfolio chart drawing device according to claim 1, wherein the graphic drawing unit draws the graphic containing one apex representing the index axis of the designated evaluation item and the evaluation value after deleting the graphic drawn for another evaluation item of the evaluation object upon a request of a user.

5. An extended portfolio chart drawing method drawing a chart incorporating radar chart information of an evaluation object on a portfolio chart, comprising:
    drawing the evaluation object on the portfolio chart;
    selecting the evaluation object from the evaluation objects drawn on the portfolio chart to display radar chart data;
    acquiring the radar chart data of the selected evaluation object from a radar chart data storage unit storing the radar chart data indicating each evaluation value of predetermined evaluation items for the evaluation object drawn on the portfolio chart; and
    overlaying a predetermined graphic generated based on the radar chart data of the selected evaluation object on the graphic of the selected evaluation object drawn in the area formed with the coordinates of the portfolio chart,
    wherein the drawing of the graphic comprises drawing, as the graphic, a polygon representing the relationship between all the evaluation values of the selected evaluation object to be drawn on the radar chart,
    designating, at an evaluation item designation unit, one of the evaluation items to be displayed on the portfolio chart,
    wherein the drawing of the graphic further comprises obtaining the evaluation items set for the radar chart, setting each index axis of the evaluation items to a line, a direction of which is predetermined as the index axis specified by a rotation angle from the predetermined base line, setting a starting position on the index axes, which is a vertex of the rotation angle, at a position of the evaluation object in the coordinates of the portfolio chart, determining points representing the evaluation values on the index axes individually, and drawing a polygonal graphic containing all the determined points as apexes representing the designated evaluation item by a direction of a bisector of the apex angle and the value of the evaluation item by a length of the bisector from the starting point to the apex.

6. The extended portfolio chart drawing method according to claim 5, wherein designating the evaluation item uses a dial having an instruction knob rotationally moved along the circumference of a predetermined circle, when the position of the instruction knob of the dial is rotationally moved by the user, the index axis is identified coincidently with a direction which specified by two position of the center of the circle and the position on the circumference of the instruction knob from the radar chart, and the evaluation item corresponding to the specified index axis is designated.

7. A computer readable recording medium storing a program for enabling a computer to operate as a processing device for drawing a chart incorporating radar chart information of an evaluation object on a portfolio chart, the processing device operated by the computer, comprising:

a portfolio drawing unit drawing the evaluation object on the portfolio chart;

a radar chart data storage unit storing radar chart data indicating each evaluation value of the predetermined evaluation items for the evaluation object drawn on the portfolio chart;

a drawing object selection unit selecting the evaluation object from the evaluation objects drawn on the portfolio chart to display the radar chart data; and a graphic drawing unit overlaying a predetermined graphic generated based on the radar chart data of the selected evaluation object on the graphic of the selected evaluation object drawn in the area formed with the coordinates of the portfolio chart, wherein the graphic drawing unit draws, as the graphic, a polygon representing the relationship between all the evaluation values of the selected evaluation object to be drawn on the radar chart, an evaluation item designation unit designating one of the evaluation items to be displayed on the portfolio chart, wherein the graphic drawing unit obtains the evaluation items set for the radar chart, set each index axis of the evaluation items to a line, a direction of which is predetermined as the index axis specified by a rotation angle from the predetermined base line, sets a starting position on the index axes, which is a vertex of the rotation angle, at a position of the evaluation object in the coordinates of the portfolio chart, determines points representing the evaluation values on the index axes individually, and draws a polygonal graphic containing all the determined points as apexes representing the designated evaluation item by a direction of a bisector of the apex angle and the value of the evaluation item by a length of the bisector from the starting point to the apex.

8. The computer readable recording medium according to claim 7, wherein the evaluation item designation unit is provided with a dial having an instruction knob rotationally moved along the circumference of a predetermined circle, and when the instruction knob of the dial is rotationally moved by an operation of a user, the index axis is identified coincidently with a direction which is specified by two position of the center of the circle and the position on the circumference of the instruction knob is specified from the radar chart, and the evaluation item corresponding to the specified index axis is designated.

* * * * *

UNITED STATES PATENT AND TRADEMARK OFFICE
CERTIFICATE OF CORRECTION

PATENT NO.         : 7,432,927 B2
APPLICATION NO.    : 11/288367
DATED              : October 7, 2008
INVENTOR(S)        : Masayuki Iguchi et al.

It is certified that error appears in the above-identified patent and that said Letters Patent is hereby corrected as shown below:

On the Title Page Item (56) (Foreign Patent Documents), Line 1, change "2020-197250" to --2002-197250--.

Column 13, Line 12, change "wherein designating the evaluation" to --wherein the designating of the evaluation--.

Signed and Sealed this

Third Day of February, 2009

JOHN DOLL
*Acting Director of the United States Patent and Trademark Office*